United States Patent
Iriya et al.

(10) Patent No.: US 7,323,240 B2
(45) Date of Patent: Jan. 29, 2008

(54) POLYPROPYLENE-BASED WRAP FILM

(75) Inventors: Masaru Iriya, Mie (JP); Takashi Nakao, Mie (JP)

(73) Assignee: Asahi Kasei Life & Living Corporation, Tokyo (JP)

( * ) Notice: Subject to any disclaimer, the term of this patent is extended or adjusted under 35 U.S.C. 154(b) by 332 days.

(21) Appl. No.: 10/496,141

(22) PCT Filed: Nov. 22, 2001

(86) PCT No.: PCT/JP01/10247

§ 371 (c)(1),
(2), (4) Date: Oct. 21, 2004

(87) PCT Pub. No.: WO03/043818

PCT Pub. Date: May 30, 2003

(65) Prior Publication Data

US 2005/0064162 A1    Mar. 24, 2005

(51) Int. Cl.
*B32B 27/08* (2006.01)
*B32B 27/32* (2006.01)
(52) U.S. Cl. ............... 428/220; 428/516; 428/517; 428/520; 428/521; 428/522; 428/910
(58) Field of Classification Search ............ 428/516, 428/517, 521, 220, 520, 522
See application file for complete search history.

(56) References Cited

U.S. PATENT DOCUMENTS

| 5,290,635 A * | 3/1994 | Matsumura et al. ........ 428/516 |
| 2002/0102423 A1* | 8/2002 | Shibata et al. .............. 428/516 |
| 2003/0099792 A1* | 5/2003 | Andersson et al. ........ 428/35.2 |

FOREIGN PATENT DOCUMENTS

| JP | 53-8295 A | 1/1978 |
| JP | 6-155677 A | 6/1994 |
| JP | 6-322194 A | 11/1994 |
| JP | 7-285200 A | 10/1995 |
| JP | 9-154479 A | 6/1997 |
| JP | 2000-191803 A | 7/2000 |

* cited by examiner

*Primary Examiner*—D. S. Nakarani
(74) *Attorney, Agent, or Firm*—Birch, Stewart, Kolasch & Birch, LLP

(57) ABSTRACT

An object of the invention is to provide a non-chlorine polypropylene wrap film excellent in adhesion, transparency, heat resistance, flexibility, gas barrier properties, touch and cutting properties, and disclosed is a polypropylene wrap film, a multilayer film having a tensile modulus of 200 to 1,000 MPa, containing at least a surface layer and an inner layer having a gas barrier resin, and being stretched into a twice or more length in a machine direction and/or a transverse direction, wherein in its multilayer constitution, the surface layer is constituted by a composition comprising, for example, a mixture of a polypropylene resin, a softening agent, an adhering agent and a liquid adhering assistant at a suitable mixing ratio, and the inner layer is constituted, for example, by an ethylene-vinyl alcohol copolymer resin.

4 Claims, No Drawings

POLYPROPYLENE-BASED WRAP FILM

TECHNICAL FIELD

The present invention relates to a film for packaging goods, etc., for example, a film used for a food packaging wrap at home. In particular, the invention relates to a polypropylene wrap film having gas barrier properties, and further excellent in adhesion, transparency, heat resistance, feel such as anti-drape stiffness and stiffness, etc.

BACKGROUND ART

When foods are stored in food business such as restaurants and food shops, and in the general home, and further, when foods are heated in microwave ovens, thin thermoplastic resin films have hitherto been used. Of these, food packaging wrap films of the vinylidene chloride copolymer resin family combine excellent properties such as moisture resistance, oxygen gas barrier properties, heat resistance, adhesion to containers, etc. and transparency, so that they are in heavy usage as food packaging wrap films.

Further, in recent years, food packaging wrap films comprising non-chlorine resins have also variously been proposed. For example, there are ones mainly comprising polyolefin resins such as a polyethylene resin, a polypropylene resin and a 4-methylpentene resin. The polyolefin resins such as the polypropylene resin are poor in gas barrier properties, and adhesion on surfaces of the films is also scarcely observed, so that adhesion performance indispensable as the food packaging wrap films is insufficient. In order to satisfy such desired performance, a great number of films have been proposed to which various additives are added, in which other resins are contained, or on which other resin layers are provided.

These films have been designed to improve adhesion to containers, heat resistance, etc. depending on the kind of resin used, the kind and amount of additive used together, the kind of resin used for lamination, etc. However, they have been inferior to the above-mentioned wrap films of the vinylidene chloride copolymer resin family in terms of gas barrier properties and adhesion to containers. Then, as techniques considering gas barrier properties of the wrap films mainly comprising non-chlorine resins, there are JP-A-6-322194 (the term "JP-A" as used herein means an "unexamined published Japanese patent application"), JP-A-6-155677, JP-A-7-3089, etc. However, none of them provide satisfactory films.

For example, in JP-A-6-322194, produced is a film having as a surface layer a resin composition in which a flexible styrene-ethylene-butylene-styrene block copolymer and liquid polybutene for imparting adhesion are mixed with a propylene resin. However, the liquid polybutene is a liquid, so that mixing thereof with the polyolefin resin results in softening of the film to cause loss of anti-drape stiffness and stiffness. Accordingly, when the film is cut, it becomes easy to cling to fingers or goods to be packaged, resulting in unavailability thereof as a packaging film.

Further, JP-A-6-155677 produces a film comprising an ethylene-vinyl alcohol layer having provided on both sides thereof adhesion imparting agent-containing polyolefin resin layers on contact with acid-modified polyolefin layers, and considers easiness of cutting as well as gas barrier properties. However, this pursues good cutting properties, so that no softening agent is contained in the film. The film is therefore rather hard, and there is further room for improvement in terms of film flexibility such as good touch and followability to the shape of goods to be packaged.

JP-A-7-3089 provides a monolayer or multilayer film comprising a resin composition further containing a polyolefin resin graft-modified with an unsaturated carboxylic acid or a derivative thereof, in addition to the composition of JP-A-6-322194. In this technique, the problems of the softened film and difficulty in handling at the time when the film is cut have also been left.

An object of the invention is to provide a non-chlorine resin film useful as a packaging film, which is improved in gas barrier properties and adhesion even when a polypropylene resin poor in gas barrier properties and adhesion is used, and further takes ease of use into account, in order to solve such problems.

DISCLOSURE OF THE INVENTION

In order to achieve the above-mentioned object, the present inventors have grappled with intensive studies. As a result, the invention has been made. That is to say, the invention is as follows.

The invention relates to a polypropylene wrap film which is a multilayer film having: a surface layer comprising 99 to 20% by weight of a polypropylene resin, 1 to 80% by weight. of a softening agent and, per 100 parts by weight of the sum of these components, 2 to 30 parts by weight of an adhering agent; and an inner layer comprising a gas barrier resin, and being stretched into a twice or more length in a machine direction and/or a transverse direction, wherein the above-mentioned softening agent is at least one selected from an amorphous or low crystalline propylene-α-olefin copolymer and crystalline polybutene-1, and wherein the above-mentioned adhering agent is at least one selected from a hydrogenated petroleum resin, a hydrogenated terpene resin, a hydrogenated rosin resin, liquid polybutene, liquid polyisobutylene and liquid butyl rubber. Further, the invention also relates to a polypropylene wrap film in which the above-mentioned softening agent is at least one selected from copolymers containing, in their molecular chain, any block structure of styrene-ethylene-butylene-styrene, styrene-butadiene-butylene-styrene, styrene-ethylene-propylene-styrene, styrene-butadiene-styrene or styrene-isoprene-styrene, and the above-mentioned adhering agent is at least one selected from a hydrogenated petroleum resin, a hydrogenated rosin resin, a hydrogenated terpene resin, liquid polyisobutylene and liquid butyl rubber.

BEST MODE FOR CARRYING OUT THE INVENTION

The polypropylene resin used in the polypropylene resin composition constituting the surface layer in the invention is blended in an amount of 20% by weight or more from the viewpoints of anti-drape stiffness, stiffness and usability of the resulting film, melt tension in preparing the film and stable film forming properties, whereas in an amount of 99% by weight or less from the viewpoints of flexibility, the feel of touch and followability to the shape of goods to be packaged. It is blended preferably in an amount of 30 to 97% by weight, and more preferably in an amount of 40 to 93% by weight. The suitable compounding ratio may be determined within the above-mentioned range depending on the softening agent described later.

The polypropylene resin has propylene units in its polymer molecular chain, and may be either a homopolymer composed of only the propylene units or a polymer in which the units exist either in block form or in random form. With respect to stereoregularity, there are polymers having various structures such as atactic, isotactic and syndiotactic structures, and any of them can be used. For example, some of commercially available propylene resins comprise mainly an isotactic polymer with some amount of an atactic polymer mixed as an accessory ingredient. It is also possible to use such resins. As the propylene copolymer resins, there are known random copolymers, three-dimensional terpolymers, etc. of ethylene, butene, etc., and any of them may be used. In particular, in order to impart flexibility, the three-dimensional terpolymers or the random polymers are advantageous, whereas homopolymers are excellent in the case of imparting heat resistance. When used in the food packaging film, a propylene resin which has passed the self-regulating standards of Japan Hygienic Olefin and Styrene Plastics Association, such as Noblen W531D or Noblen FS2011D manufactured by Sumitomo Chemical Co., Ltd., is more preferred.

The melt flow rate of the polypropylene resin is more preferably within the range of 1 to 20 g/10 minutes with a load of 2.16 kg applied at 230° C. in a process per JIS-K6758.

The softening agents added to the above-mentioned polypropylene resin include an amorphous or low crystalline propylene-$\alpha$-olefin copolymer and crystalline polybutene. The low crystalline copolymer as used herein means a resin generally called an "amorphous" or "low crystalline" propylene-$\alpha$-olefin copolymer in this industry. As the standard of low crystallinity, for example, the copolymer having a crystallinity of about 25% or less corresponds thereto.

Further, the softening agents include a copolymer containing any block structure of styrene-ethylene-butylene-styrene, styrene-butadiene-butylene-styrene, styrene-ethylene-propylene-styrene, styrene-butadiene-styrene and styrene-isoprene-styrene, in its molecular chain. As to which should be selected, the most suitable one is selected depending on the kind of polypropylene resin and adhering agent added together to the surface layer or the performance of a desired film. For example, when the softening agent is selected from the later group in order to obtain moderate flexibility, one other than liquid polybutene is selected as the above-mentioned adhering agent. Further, when used in food packaging use, it is preferred that an adhering agent which has passed the self-regulating standards of Japan Hygienic Olefin and Styrene Plastics Association, such as Tafmer XR series manufactured by Mitsui Chemicals or Tuftec L515 manufactured by Asahi Kasei Corporation, is selected.

The amorphous or low crystalline propylene-$\alpha$-olefin copolymer is a copolymer of an $\alpha$-olefin such as ethylene, propylene, butene or pentene with propylene, and means a low crystalline or amorphous one. This itself is rich in flexibility, and when further mixed with the polypropylene resin, it is mixed without impairing transparency to bring about the effect of making the film flexible.

The crystalline polybutene-1 is a homopolymer of butene-1 polymerized to high molecular weight and having a crystallinity of about 50% or a copolymer with propylene or ethylene, and is excellent in flexibility and heat resistance. This is different from a liquid low molecular weight polybutene.

In the copolymer (hereinafter also referred to as the styrene block copolymer) containing any block structure of styrene-ethylene-butylene-styrene, styrene-butadiene-butylene-styrene, styrene-ethylene-propylene-styrene, styrene-butadiene-styrene and styrene-isoprene-styrene, in its molecular chain, a polystyrene moiety of a hard segment constitute a physical crosslinking to form a domain phase, and an intermediate ethylene-butylene or ethylene-propylene moiety exhibits rubber elasticity as a soft segment. Although the copolymers are divided into two types, a straight chain type and a radial type, from the arrangement conformation of the hard segment and the soft segment, both can be used. The ratio of the above-mentioned block structure in the copolymer can be set depending on desired flexibility. The use of hydrogenated products of these copolymers can inhibit odor, so that they can be suitably used as food packaging wrap films.

These styrene block copolymers have good compatibility with the polypropylene resins, and blending of a suitable amount thereof gives the effect of reducing tensile modulus or bending modulus, that is to say, the effect of imparting flexibility, without largely impairing the original transparency, moisture resistance and heat resistance of the polypropylene resins. This can provide stability of adhesion strength, followability to the shape of goods to be packaged, good feel of touch, the effect of giving a good adhesion feeling in packaging food etc., and the effect of reducing a hard sound generated from a film when it is peeled from a container etc., as the packaging film.

From the viewpoint of flexibility of the resulting film, the amount thereof added is required to be 1% by weight or more, when the polypropylene resin and the softening agent are taken as 100% by weight in total. From the viewpoints of melt tension in film formation, processability, appearance and grade of the product, anti-drape stiffness, stiffness, etc., it is 80% by weight or less, more preferably from 3 to 70% by weight, and still more preferably from 7 to 60% by weight.

The adhering agent added to the above-mentioned polypropylene resin is at least one selected from a petroleum resin such as a hydrogenated petroleum resin, a hydrogenated terpene resin, a hydrogenated rosin resin, liquid polybutene, liquid polyisobutylene and liquid butyl rubber. The amount thereof added is required to be 2 parts by weight or more from the viewpoint of adhesion performance, when the composition comprising the polypropylene resin and the softening agent is taken as 100 parts by weight, and 30 parts by weight or less, from the viewpoints of stickiness of the film, blocking between the films, melt tension, stability associated therewith in film formation and variations in film thickness caused thereby, and film forming properties, and from the viewpoints of flexibility of the film and adhesion performance when the hydrogenated petroleum resin or the hydrogenated terpene resin is used. It is preferably from 3 to 25 parts by weight, and more preferably from 4 to 22 parts by weight.

The petroleum resin as used herein is a synthetic resin obtained by polymerizing and/or purifying C5 and C9 fractions etc. obtained by naphtha cracking at the time of petroleum refinery, and examples thereof include a dicyclopentadiene resin, as well as an aliphatic hydrocarbon resin, an alicyclic hydrocarbon resin and an aromatic hydrocarbon resin. When used in the food-packaging film, it requires safety, product grade such as odor and color tone, and further performance such as stability of adhesion performance. Accordingly, the hydrogenated petroleum resin which is a hydrogenated product thereof is used. From the viewpoints of a decrease in bleeding out of low molecular weight components for enhancing withdrawing properties at the time when the formed film is wound in roll form, touch of the film itself, and usability of the film, the softening point by the ring and ball method is preferably 90° C. or higher, and from the viewpoints of flexibility and adhesion force, it is more preferably 140° C. or lower.

The terpene resin is a homopolymer using as a starting material α-pinene, β-pinene, limonene, dipentene or the like obtained from pine tree bark or citrus fruit peel, or a copolymer thereof. Although there are various types of resins, a hydrogenated product is preferably used for the same reason as described above when the food packaging film is assumed. In the case of the terpene resin, the softening point is preferably 100° C. or lower from the viewpoint of stickiness of the film etc., and more preferably 145° C. or lower from the viewpoints of flexibility and adhesion force of a surface layer portion into which this is incorporated.

The hydrogenated rosin resin is a resin in which hydrogen is added to a conjugated double bond of abietic acid which is a main component of rosin such as gum rosin obtained from fine resin by distillation, wood rosin obtained by extracting pine roots after chip formation with a solvent, and tall oil resin separated from waste liquid in the production of craft pulp. The hydrogenated product is improved in weather resistance and heat stability, and addition thereof to the film causes little odor and transparency. Accordingly, it is suitably used. The softening temperature of the hydrogenated rosin resin is preferably 80° C. or higher from the viewpoint of stickiness of the film etc., and preferably 115° C. or lower from the viewpoints of flexibility and adhesion.

The liquid polybutene is viscous liquid or amorphous solid, and transparent or translucent. A copolymer of isobutylene and butene is called liquid polybutene, which is different from a crystalline high molecular weight polybutene-1 resin. Further, the liquid polyisobutylene is a homopolymer of isobutylene, which is an amorphous semi-solid transparent or translucent polymer showing extremely high viscosity at ordinary temperature. Furthermore, the liquid butyl rubber is one obtained by copolymerizing 2% or less of isoprene with polyisobutylene, and a colorless, tasteless, odorless, liquid or semi-solid rubber. Of the liquid polybutenes, a hydrogenated product is more preferred. When the softening agent is the styrene block copolymer, one other than the liquid polybutene is used as the adhering agent. Both of the liquid polybutene and the above-mentioned styrene block copolymer have the high softening effect, so that the use of both at the same time results in softening of the film to cause loss of anti-drape stiffness and stiffness. Accordingly, when the film is cut, it becomes easy to cling to fingers or goods to be packaged, resulting in unavailability thereof as a packaging film.

The liquid polybutene preferably has a number average molecular weight of about 300 to about 4,000, and the liquid polyisobutylene or the liquid butyl rubber preferably has a viscosity-average molecular weight of about 20,000 to about 60,000. These are appropriately selected depending on desired adhesion force. For example, it is also possible to mix two or more kinds of the liquid polybutenes having different molecular weights, the liquid polyisobutylene and the liquid butyl rubber to adjust the molecular weight to a desired value. Further, the liquid polybutene may be mixed with the liquid polyisobutylene or the liquid butyl rubber as needed.

Further, a liquid adhering assistant can be added for adjustment of adhering force without departing from the object of the invention. The liquid adhering assistants include at least one selected from a mineral oil, a white mineral oil, a polyalkylene glycol, an alkylene glycol, a sucrose fatty acid ester, a glycerol fatty acid ester, a sorbitan fatty acid ester, a polyglycerol fatty acid ester, a propylene glycol fatty acid ester and a higher alcohol fatty acid ester. When the composition comprising the polypropylene resin and the softening agent is taken as 100 parts by weight, the amount thereof added is preferably 0.01 parts by weight or more based thereon from the viewpoint of sufficiently obtaining the effect of the adhering assistant, and 30 parts by weight or less from the viewpoints of feel of touch and stable adhesion performance. It is more preferably from 0.1 to 25 parts by weight, and cutting properties and touch are improved within this range. These adhering assistants are liquid, so that it is possible to previously dissolve or disperse both of the liquid polybutene and the liquid polyisobutylene therein, followed by addition to the polypropylene resin in some cases.

The liquid adhering assistant exists on a surface of the film, and wetly spreads over an adherend to promote autohesion of the film, so that cling of the film to the adherend is improved. Accordingly, when adhesion force is intended to be enhanced, it is preferred that the content of the liquid adhering assistant is increased. Further, when adhesion force of the mixed resin is strong, the existence of these liquids on the surface decreases the area of the adhering material contacting with the adherend. By utilizing such a function, it is possible to adjust adhesion force on the film surface to the suitable range, and energy necessary for withdrawal of the film wound in roll form can be adjusted so as to be reduced.

It is also possible to further incorporate a known additive into the surface layer comprising the polypropylene resin composition without departing from the object of the invention.

A resin excellent in gas barrier properties is used in an inner layer. Examples thereof include, for example, an amorphous nylon, as well as an ethylene-vinyl alcohol copolymer resin, an aromatic crystalline nylon such as nylon MXD6, and an aliphatic crystalline nylon such as nylon 6, nylon 66 or nylon 12.

The ethylene-vinyl alcohol copolymer resin is a crystalline resin obtained, for example, by copolymerizing ethylene and vinyl acetate under high pressure, removing the monomers, and then, conducing saponification treatment with an alkali such as caustic soda, followed by drying. The ethylene content of the ethylene-vinyl alcohol copolymer resin used in the invention is preferably 20 mol % or more from the viewpoints of melt viscosity and forming processability, and more preferably 50 mol % or less from the viewpoint of gas barrier properties. In order to ensure forming processability, it is also possible to blend a known plasticizer etc. in a suitable amount without impairing the original gas barrier properties and aroma retention associated therewith. The compounding amount is preferably 10 parts by weight or less per 100 parts by weight of the ethylene-vinyl alcohol copolymer resin.

The nylon MXD6 is a thermoplastic crystalline resin obtained, for example, from m-xylylenediamine and adipic acid, and has an aromatic ring in its molecular chain structure. Further, the nylon 6 is a thermoplastic resin produced, for example, by ring-opening polymerization of 6-caprolactam or polycondensation of ω-aminocaproic acid, and excellent in gas barrier properties. The nylon 66 is a thermoplastic resin produced, for example, by polycondensation of hexamethylenediamine and adipic acid, and the nylon 12 is a thermoplastic resin produced, for example, by obtaining cyclododecatriene and cyclododecaene using butadiene as a starting material, and further obtaining ω-laurolactam therefrom, followed by ring-opening polymerization, or by forming aminododecanoic acid via peroxyamine and cyanoundecanoic acid from cyclohexanone as a starting material, and then polymerizing it. The amorphous nylon is an amorphous nylon having an aromatic ring in its molecular structure, and a resin having low water absorption and excellent gas barrier properties. In order to ensure forming processability, or in order to ensure, for example, performance at the time when the film is used as the food packaging film, it is also possible to blend a known additive etc. in a suitable amount, and there is no particular limitation on the melt index and melting point of the nylon resin it self.

In the multilayer structure, an adhesive resin layer of a known resin composition or a rework layer constituted by trim edges etc. at the time when the film is produced may be arranged in addition to the surface layer and the inner layer without impairing the object of the invention. Further, in order to adjust various properties such as thickness, flexibility and heat resistance, a polypropylene resin etc. may be further arranged.

For example, a resin having propylene units in its polymer molecular chain similarly to the polypropylene resin of the surface layer is preferably used in the composition layer mainly comprising the polypropylene resin, which is arranged between the surface layer and the inner layer. The propylene units may be arranged in the molecular chain either in block form or in random form, and a homopolymer composed of only the propylene units may be used.

With respect to stereoregularity, there are polymers having various structures such as atactic, isotactic and syndiotactic structures, and any of them can be used. For example, some of commercially available propylene resins comprise mainly an isotactic polymer with some amount of an atactic polymer mixed as an accessory ingredient. It is also possible to use such resins. As the copolymers, there are generally known random copolymers, three-dimensional terpolymers, etc. with ethylene, butene, etc. Preferably, it is preferred that no slip agent or no anti-blocking agent is contained as an additive. When used in the food packaging film, a propylene resin which has passed the self-regulating standards of Japan Hygienic Olefin and Styrene Plastics Association, such as Noblen W531D or Noblen FS2011D manufactured by Sumitomo Chemical Co., Ltd., is more preferred from the viewpoint of safety. The melt flow rate is preferably within the range of 1 to 20 g/10 minutes with a load of 2.16 kg applied at 230° C. in a process in accordance with JIS-K6758.

The tensile modulus related to the flexibility of the whole film is preferably from 200 to 1,000 MPa. This is measured in accordance with a process described in ASTM-D-882 using a tensile tester as the average value of tensile moduli at a strain of 2% in a machine direction (MD, a withdrawing direction) and a transverse direction (TD, a direction perpendicular to the withdrawing direction). When it is within this range, the film is excellent in flexibility, anti-drape stiffness and stiffness, and excellent in flexibility and adhesion. It is preferably from 400 to less than 700 MPa.

The adhesion of the film is measured in accordance with a process described in JIS-Z-0237, and a 20-mm wide film attached on a glass plate with a weight roll having a weight of 2 kg and a width of 45 mm is subjected to the 90-degree peel test. In this case, the peel strength value is preferably 0.7 cN or more, and more preferably 1.5 cN or more. However, the upper limit thereof is 4 cN from ease of withdrawing the film. When more excellent ease of withdrawing is required, it is preferably 3 cN or less.

The tensile modulus within the above-mentioned range and the adhesion are achieved by an optimum combination of the softening agent ad the adhering agent, and the liquid assistant and the polypropylene resin in some cases. For example, preferred is a combination of the amorphous or low crystalline propylene-α-olefin and the liquid polybutene in specified amounts, or a combination of styrene-ethylene-butylene-styrene, the hydrogenated petroleum resin and the mineral oil in specified amounts.

For the whole layer constitution ratio, for example, in a five-layer constitution of a surface layer, an adhesive layer, an inner layer, an adhesive layer and a surface layer, both surface layers are preferably adjusted within the range of a ratio of 50 to 90, both adhesive layers within the range of a ratio of 5 to 30, and the inner layer within the range of a ratio of 5 to 25. Further, for example, in a seven-layer constitution of a surface layer, a composition layer mainly comprising a polypropylene resin, an adhesive layer, an inner layer, an adhesive layer, a composition layer mainly comprising a polypropylene resin and a surface layer, both surface layers are preferably adjusted within the range of a ratio of 5 to 20, both composition layers mainly comprising a polypropylene resin within the range of a ratio of 40 to 85, both adhesive layers within the range of a ratio of 5 to 20, and the inner layer within the range of a ratio of 5 to 25. Although the two surface layers or the two adhesive layers may be different from each other in thickness, it is preferred that they have the same thickness because two sides are not distinguished. The thickness of the whole film is preferably 3 μm or more from the viewpoints of strength as the film, anti-drape stiffness, stiffness, flexibility in packaging and gas barrier properties, and more preferably 25 μm or less from the viewpoints of adhesion to goods in packaging, the weight and roll diameter of a product at the time when the film is wound in roll form, ease of handling in use, etc. In particular, in order to balance gas barrier properties, flexibility and followability to goods to be packaged, it is more preferably from 6 to 15 μm.

As a method for producing the film of the invention, it is possible to use a known film forming method. The. polypropylene resin composition of the surface layer is prepared by melt kneading by means of an extruder or the like. When the softening agent and the adhering agent are solid, namely pellet-like, granular, flak-like or powdery, specified amounts thereof are put into a blender or the like together with commercially available polypropylene pellets, followed by sufficiently homogeneous mixing. The resulting mixture is put into an extruder for the surface layers, and kneaded at an appropriate temperature to form a homogeneous composition. The composition-can also be extruded together with the adhesive layers and the inner layer through a multilayer die as a multilayer film. Further, these are sufficiently melt kneaded by a known method, and pelletized with a pelletizer or the like. Then, the pellets can also be dried to use.

When the function of the liquid additive is imparted to the film, there is a method in which the additive is applied on the film after formation. However, for example, it can be injected into the melt resin, for example, in a melt zone of a single-screw extruder, twin-screw extruder or the like with a pressure liquid transfer pump, and kneaded.

In order to produce the multilayer film, for example, the adhesive layer-containing five-layer constitution, extruders for the adhesive layers and the inner layer are disposed in parallel with the above-mentioned extruder for the surface layers, and each specified resin is put into each of them, followed by sufficient kneading and melting. The resins from these extruders are allowed to run together downstream therefrom to form the five-layer constitution, and extruded in sheet form, for example, through a circular die or a T-die having a slit-like discharge opening. The resins extruded are solidified by cooling according to a process such as passing through a cooling tank or contact with a cooling roll.

The sheet obtained after extrusion is stretched in a machine direction and/or a transverse direction by a known method, that is to say, a tenter method or an inflation method. From the viewpoints of strength as the film and cutting properties of the film at the time when it is used as the packaging wrap, it is stretched into a twice or more length in a machine direction and/or a transverse direction when it is stretched by the tenter method, the order of the machine direction and the transverse direction is not particularly specified. Further, the ratios of the machine direction and the transverse direction may not be identical with each other. The film in which stretching has been completed is commercialized through a process depending on a desired product form, such as trimming of edges, cutting to a desired size, or winding around a tube when the film is wound around a paper core to produce a film wound in roll form.

The film obtained by the invention is excellent in adhesion, transparency, heat resistance, flexibility, good touch, gas barrier properties, moisture resistance, cutting properties and safety. The film is suitably used, for example, as a food packaging wrap film for domestic use.

EXAMPLES

Embodiments of the invention are exemplified below. All are embodiments of the invention, and the invention should not be construed as being limited to these examples.

Performance evaluation methods of the film obtained by the invention are as follows.

The adhesion was evaluated in accordance with a process described in JIS-Z-0237, and the 20-mm wide film attached on a glass plate with a weight roll having a weight of 2 kg and a width of 45 mm was subjected to the 90-degree peel test. In this case, the film having a peel strength value (P) of 1.5 cN or more was graded A, 0.7 cN to less than 1.5 cN was graded B, 0.3 cN to less than 0.7 cN was graded C, and less than 0.3 cN was graded D.

As for the transparency, the haze (H) of the resulting film was measured with an NDH-300A instrument (manufactured by Nippon Denshoku Industries Co., Ltd.) in accordance with a process described in ASTM-D-103. The film having a measured value of less than 1.0 was graded A, 1.0 to less than 2.0 was graded B, 0.2 to less than 3.0 was graded C, and 3.0 or more was graded D.

As for the heat resistance, the film having a heat resistance temperature (T) of 140° C. or higher in accordance with Tokyo Metropolitan Consumer Regulation, Article 11, was graded A, 130 to 135° C. was graded B, and 125° C. or lower was graded C.

As for the flexibility, the tensile modulus at a strain of 2% in a machine direction (MD) and a transverse direction (TD) was measured in accordance with a process described in ASTM-D-882 using a Tensilon tester. The film having an average value (M) of both in the machine direction and the transverse direction of 400 to less than 700 MPa was graded A, 200 to less than 400 MPa and 700 to less than 1,000 MPa were graded B, 100 to less than 200 MPa was graded C, and less than 100 MPa or 1,000 MPa or more was graded D.

As for the touch, 50 randomly selected housewives functionally evaluated the touch of the film as "good" or "poor". When the number (N) of housewives who judged it "good" was 45 or more, that case was graded A, 40 or more was graded B, 30 or more was graded C, and the others-were graded D.

As for the gas barrier properties, the barrier properties against oxygen gas was measured by a process in accordance with ASTM-D-3985 using an OX-TRAN200H tester manufactured by MOCON, Inc. When the value (B) under the conditions of atmospheric pressure, a temperature of 23° C. and a humidity of 65% was less than 200 cm$^3$/m$^2$·24 hrs·atm·11 µm, it was graded A, 200 to less than 500 cm$^3$/m$^2$·24 hrs·atm·11 µm was graded B, and 500 cm$^3$/m$^2$·24 hrs·atm·11 µm or more was graded D.

As for the cutting properties of the film, the resulting film 300 mm wide and 10 m long was wound around a paper core, and finished to winding form like a wrap for food packaging. Then, this was put in a commercially available dispenser box for a wrap for domestic use, and cut with a saw blade attached thereto. From the cut state at that time, the film cleanly cuttable with light force was graded A, one cleanly cuttable although requiring some force was graded B, one hard to be cut although cuttable was graded C, and one unsuccessfully cuttable to cause elongation of the film, oblique tearing or collapse of the fancy box with too large force applied was graded D.

The above are summarized in Table 1. In all evaluation items, A is most excellent, A and B are grades showing practicability, and C and D are judged to have practically a problem.

TABLE 1

|  | Unit | A | B | C | D |
|---|---|---|---|---|---|
| Adhesion | cN | $1.5 \leq P \leq 4$ | $0.7 \leq P < 1.5$ | $0.3 \leq P < 0.7$ | $P < 0.3$ |
| Transparency | % | $H < 1.0$ | $1.0 \leq H < 2.0$ | $2.0 \leq H < 3.0$ | $3.0 \leq H$ |
| Heat Resistance | ° C. | $140 \leq T$ | $T = 130$ or $135$ | — | $T \leq 125$ |
| Flexibility | MPa | $400 \leq M < 700$ | $200 \leq M < 400$ or $700 \leq M < 1000$ | $100 \leq M < 200$ | Other than the left |
| Oxygen Gas Barrier Properties | Cm3/m2 · 24 hrs · atm · 11 µm | $B < 200$ | $200 \leq B < 500$ | — | $500 \leq B$ |
| Touch | The number of persons | $45 \leq N$ | $40 \leq M < 45$ | $30 \leq M < 40$ | $N < 30$ |
| Cutting Properties | — | Cleanly Cuttable with light force | Cleanly Cuttable although requiring some force | Hard to be cut although cuttable | Other than the left |

Example 1

A polypropylene resin (Noblen W531D manufactured by Sumitomo Chemical Co., Ltd., a random copolymer of propylene-ethylene-butene, MFR=9 g/10 min), a styrene-ethylene-butylene-styrene block copolymer resin (Tuftec L515 manufactured by Asahi Kasei Corporation) as a softening agent, and further a hydrogenated dicyclopentadiene petroleum resin (MARUKAREZ H925C manufactured by Maruzen Petrochemical Co., Ltd.) as an adhering agent were blended. The polypropylene resin and the softening agent were blended at a weight ratio of 80:20 and, to 100 parts by weight of the sum of them, the adhering agent was added at a ratio of 5 parts by weight. They were put into a blender, and sufficiently mixed at ordinary temperature for 5 minutes.

The mixed pellets were put into an extruder for surface layers of a multilayer extruder apparatus for three-kind five layers of surface layers, adhesive layers and an inner layers. Further, an acid-modified polypropylene adhesive resin (Admer QF570 manufactured by Mitsui Chemicals) was put into an extruder for the adhesive layers, and an ethylene-vinyl alcohol copolymer resin (Eval EP-S124B manufactured by Kuraray Co., Ltd.) was put into an extruder for the inner layer. Each resin was sufficiently melt kneaded in each extruder, laminated at a temperature of 220° C. in a multilayer circular die, and extruded as a three-kind five-layer film.

The resulting film was stretched with an inflation bubble type stretching machine at a stretching temperature of 120° C. five-fold in a machine direction and four-fold in a transverse direction. Then, edges of the film were trimmed to obtain an approximately uniform film having a total thickness of 11 µm. The respective layers, the surface layer, the adhesive layer, the inner layer, the adhesive layer and the surface layer, had thickness of 35, 10, 10, 10 and 35, respectively, in this order, taking the thickness of all layers as 100. The physical properties of this film were measured. As a result, the film exhibited good performance as shown in Table 2.

Example 2

An 11-µm thick film was obtained in the same manner as with Example 1 with the exception that the same polypropylene resin and styrene-ethylene-butylene-styrene block copolymer resin as used in the resin composition of the surface layers of Example 1 were blended at a weight ratio of 95:5 and, per 100 parts by weight of the sum of them, a mineral oil (Smoil P70 manufactured by Matsumura Oil Co., Ltd.) was further added as a liquid adhering assistant, in addition to the adhering agent of Example 1, in an amount of 10 parts by weight. The physical properties of this film were measured. As a result, the film exhibited good performance as shown in Table 2.

Example 3

An 11-µm thick film was obtained in the same manner as with Example 1 with the exception that a mineral oil (Smoil P70 manufactured by Matsumura Oil Co., Ltd.) was further added as a liquid adhering assistant to the resin composition of the surface layer of Example 1 in an amount of 5 parts by weight per 100 parts by weight of the sum of the polypropylene resin and the softening agent. The physical properties of this film were measured. As a result, the film exhibited good performance as shown in Table 2.

Example 4

An 11-µm thick film was obtained in the same manner as with Example 2 with the exception that the liquid adhering assistant in the resin composition of the surface layers of Example 2 was changed to 10 parts by weight of a fatty acid triglyceride (Actor LO1 manufactured by Riken Vitamin Co., Ltd.). The physical properties of this film were measured. As a result, the film exhibited good performance as shown in Table 2.

Example 5

An 11-µm thick film was obtained in the same manner as with Example 3 with the exception that the polypropylene resin was substituted by a homopolypropylene (Noblen FS2011D manufactured by Sumitomo Chemical Co., Ltd., MFR=2.5 g/10 min), and the mixing weight ratio thereof to the softening agent was changed to 70:30. The physical properties of this film were measured. As a result, the film exhibited good performance as shown in Table 2.

Example 6

An 11-µm thick film was obtained in the same manner as with Example 3 with the exception that the adhering agent was changed to 15 parts by weight of a hydrogenated terpene resin (Clearon P125 manufactured by Yasuhara Chemical Co., Ltd.). The physical properties of this film were measured. As a result, the film exhibited good performance as shown in Table 2.

Example 7

An 11-µm thick film was obtained in the same manner as with Example 3 with the exception that the softening agent was changed to a low crystalline propylene-α-olefin copolymer resin (Tafmer XR110T manufactured by Mitsui Chemicals, and the adhering agent was changed to 10 parts by weight of a liquid hydrogenated polybutene (Nissan Polybutene 10SH manufactured by NOF Corporation). The physical properties of this film were measured. As a result, the film exhibited good performance as shown in Table 2.

Example 8

A film was obtained in the same manner as with Example 2 with the exception that the thickness of the film obtained in Example 2 was changed to 20 µm. As a result, the film exhibited good performance as shown in Table 2.

Example 9

An 11-µm thick film was obtained in the same manner as with Example 7 with the exception that 10 parts by weight of a hydrogenated rosin ester (FORAL 105 manufactured by Hercules Incorporated) was used in place of 10 parts by weight of the liquid hydrogenated polybutene (Nissan Polybutene 10SH manufactured by NOF Corporation) used as the adhering agent of the surface layer in Example 7. The physical properties of this film were measured. As a result, the film exhibited good performance as shown in Table 2.

Comparative Example 1

Surface layers were constituted by a composition in which MARUKAREZ H925C used as the adhering agent of the surface layers in Example 1 was not used. As a result, no more than performance as shown in Table 2 was obtained.

Comparative Example 2

Surface layers were constituted by a composition in which Tuftec L515 used as the softening agent of the surface layers in Example 1 was not used. As a result, no more than performance as shown in Table 2 was obtained.

Comparative Example 3

A film was constituted only by the surface layers and the adhesive layers without using the ethylene-vinyl alcohol copolymer resin Eval EP-S124B used as the inner layer resin in Example 1. As a result, no more than performance as shown in Table 2 was obtained.

Comparative Example 4

Surface layers were constituted by a composition in which MARUKAREZ H925C used as the adhering agent of the surface layers in Example 3 was not used. As a result, no more than performance as shown in Table 2 was obtained.

Comparative Example 5

The amount of MARUKAREZ H925C used as the adhering agent of the surface layers in Example 3 was increased to 50 parts by weight. As a result, the blocking of a film wound occurred during storage. Performance was evaluated using a film stored without being wound in forming the film. However, no more than performance as shown in Table 2 was obtained. Even when the film was wound around a paper core, it could not be easily withdrawn for the reason as described above. It was therefore impossible to evaluate cutting properties.

Comparative Example 6

The amount of Tuftec L515 used as the softening agent of the surface layers in Example 3 was increased to 90% by weight. As a result, extrusion of the surface layer resin was not stabilized, resulting in failure to form a film having good appearance.

Comparative Example 7

It was attempted to obtain a film in the same manner as with Example 3 with the exception that Smoil P70 used as the liquid assistant of the surface layer in Example 3 was added in an amount of 45 parts by weight. As a result, the melt tension of the surface layer resin was too low to stably extrude it, resulting in failure to obtain a film possible to be evaluated.

Comparative Example 8

A film was obtained in the same manner as with Example 7 with the exception that an ethylene-α-olefin copolymer resin (Tafmer P0680 manufactured by Mitsui Chemicals) was used in place of the propylene-α-olefin copolymer resin used as the softening agent of the surface layers in Example 7. As a result, no more than performance as shown in Table 2 was obtained.

Comparative Example 9

A film was obtained in the same manner as with Example 7 with the exception that a styrene-ethylene-butylene-styrene block copolymer resin (Tuftec L515 manufactured by Asahi Kasei Corporation) was used in place of the propylene-α-olefin copolymer resin used as the softening agent of the surface layers in Example 7. As a result, no more than performance as shown in Table 2 was obtained.

TABLE 2

|  | Example | | | | | | | | |
| --- | --- | --- | --- | --- | --- | --- | --- | --- | --- |
|  | 1 | 2 | 3 | 4 | 5 | 6 | 7 | 8 | 9 |
| Polypropylene | W531D | ← | ← | ← | FS2011D | W531D | ← | ← | ← |
|  | 80 wt % | 95 wt % | 80 wt % | 95 wt % | 70 wt % | 80 wt % | ← | 95 wt % | 80 wt % |
| Softening | L515 | ← | ← | ← | ← | L515 | XR110T | L515 | XR110T |
| Agent | 20 wt % | 5 wt % | 20 wt % | 5 wt % | 30 wt % | 20 wt % | 20 wt % | 5 wt % | 20 wt % |
| Adhering | H925C | ← | ← | ← | ← | P125 | 10SH | H925C | FORAL105 |
| Agent | 5 wt. parts | ← | ← | ← | ← | 15 wt. parts | 10 wt. parts | 5 wt. parts | 10 wt. parts |
| Liquid Adhering Assistant | nil | P70 10 wt. parts | P70 5 wt. parts | LO1 10 wt. parts | P70 5 wt. parts | ← | ← | 10 wt. parts | 5 wt. parts |
| Adhesive Layer | QF570 | ← | ← | ← | ← | ← | ← | ← | ← |
| Inner Layer | EP-S124B | ← | ← | ← | ← | ← | ← | ← | ← |
| Adhesion | B | A | A | A | B | A | A | A | A |
| Transparency | A | A | A | A | A | A | A | B | A |
| Heat Resistance | A | A | A | A | A | A | B | A | B |
| Flexibility | A | A | A | A | A | A | A | A | A |
| Oxygen Gas Barrier Properties | A | A | A | A | A | A | A | A | A |
| Touch | A | A | A | A | A | B | A | B | A |
| Cutting Properties | A | A | A | A | A | A | B | A | A |

TABLE 2-continued

| | Example Comparative Example | | | | | | | | |
|---|---|---|---|---|---|---|---|---|---|
| | 1 | 2 | 3 | 4 | 5 | 6 | 7 | 8 | 9 |
| Polypropylene | W531D | ← | ← | ← | ← | ← | ← | ← | ← |
| | 80 wt % | ← | ← | ← | ← | 10 wt % | 80 wt % | ← | ← |
| Softening Agent | L515 | nil | L515 | ← | ← | ← | ← | P0680 | L515 |
| | 20 wt % | | 20 wt % | ← | ← | 90 wt % | 20 wt % | 20 wt % | ← |
| Adhering Agent | nil | H925C | ← | nil | H925C | ← | ← | 10SH | ← |
| | | 5 wt. parts | ← | | 50 wt. parts | ← | ← | 10 wt. parts | ← |
| Liquid Adhering Assistant | nil | nil | nil | P70 | ← | ← | ← | ← | ← |
| | | | | 5 wt. parts | ← | ← | 45 wt. parts | 5 wt. parts | ← |
| Adhesive Layer | QF570 | ← | ← | ← | ← | ← | ← | ← | ← |
| Inner Layer | EP-S124B | ← | nil | EP-S124B | ← | ← | ← | ← | ← |
| Adhesion | D | D | B | D | C | No evaluable film was obtained. | No evaluable film was obtained. | C | A |
| Transparency | A | A | A | A | C | | | D | A |
| Heat Resistance | A | A | B | A | D | | | B | B |
| Flexibility | A | D | A | A | D | | | C | C |
| Oxygen Gas Barrier Properties | A | A | D | A | A | | | B | A |
| Touch | A | D | A | A | C | | | C | D |
| Cutting Properties | B | A | A | B | — | | | D | C |

(Notes)
W531D: Noblen W531D
FS2011D: Noblen FS2011D
L515: Tuftec L515
XR110T: Tafmer XR110T
P0680: Tafmer P0680
H925C: MARUKAREZ H925C
P125: Clearon P125
10SH: Nissan Polybutene 10SH
QF570: Admer QF570
EP-S124B: Eval EP-S124B
P70: Smoil P70
LO1: Actor LO1

While the invention has been described in detail with reference to specific embodiments thereof, it will be obvious to those skilled in the art that various changes and modifications may be made without departing from the spirit and scope of the invention.

INDUSTRIAL APPLICABILITY

As described above, the film according to the invention can provide the polypropylene wrap film excellent in adhesion, transparency, heat resistance, flexibility, gas barrier properties, touch and cutting properties. The film can be suitably used, for example, for food packaging wrap films.

The invention claimed is:

1. A polypropylene wrap film which is a multilayer film having: a surface layer comprising 99 to 20% by weight of a polypropylene resin, 1 to 80% by weight of a softening agent and, per 100 parts by weight of the sum of these components, 2 to 30 parts by weight of an adhering agent; and an inner layer comprising a gas barrier resin, and being stretched into a twice or more length in a machine direction and/or a transverse direction, wherein said softening agent is at least one selected from the group consisting of an amorphous or low crystalline propylene-α-olefin copolymer and crystalline polybutene-1, wherein said adhering agent is at least one selected from the group consisting of a hydrogenated petroleum resin, a hydrogenated terpene resin, a hydrogenated rosin resin, liquid polybutene, liquid polyisobutylene and liquid butyl rubber, wherein the surface layer contains a liquid adhering assistant in an amount of 0.01 to 30 parts by weight per 100 parts by weight of the sum of the polypropylene resin and the softening agent contained in the surface layer, and said liquid adhering assistant is at least one selected from the ground consisting of a mineral oil and a white mineral oil, wherein the gas barrier resin of the inner layer is an ethylene-vinyl alcohol copolymer resin, and wherein the polypropylene wrap film has a degree of adhesion of from 0.7 to 4 cN.

2. The polypropylene wrap film according to claim 1, which has a tensile modulus of 200 to 1,000 MPa.

3. The polypropylene wrap film according to claim 1 or 2, having a total film thickness of from 3 to 25 μm.

4. The polypropylene wrap film according to claim 1, which has a tensile modulus of 400 to 700 MPa.

* * * * *